US006451938B1

(12) United States Patent
Fisher et al.

(10) Patent No.: US 6,451,938 B1
(45) Date of Patent: *Sep. 17, 2002

(54) POLYMERIZATION CATALYST SYSTEM COMPRISING HETEROCYCLIC FUSED CYCLOPENTADIENIDE LIGANDS

(75) Inventors: Richard Allen Fisher, Malvern, PA (US); Rolf Bodo Temme, Dormagen (DE)

(73) Assignee: Exxon Mobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,214

(22) Filed: Dec. 29, 1997

Related U.S. Application Data

(63) Continuation-in-part of application No. 08/806,181, filed on Feb. 25, 1997, now abandoned.

(51) Int. Cl.$^7$ ............... C08F 4/44; C08F 4/60; C08F 4/64

(52) U.S. Cl. ............ 526/161; 526/132; 526/134; 526/160; 526/943; 502/117; 502/152; 502/155

(58) Field of Search .................. 502/117, 152, 502/155; 526/160, 161, 943, 172, 132, 134

(56) References Cited

U.S. PATENT DOCUMENTS

| | | | |
|---|---|---|---|
| 4,543,399 A | 9/1985 | Jenkins et al. | 526/70 |
| 4,588,790 A | 5/1986 | Jenkins et al. | 526/67 |
| 4,921,825 A | 5/1990 | Kioka et al. | 502/104 |
| 4,923,833 A | 5/1990 | Kioka et al. | 502/9 |
| 5,026,798 A | 6/1991 | Canich | 526/127 |
| 5,028,670 A | 7/1991 | Chinh et al. | 526/73 |
| 5,198,401 A | 3/1993 | Turner et al. | 502/155 |
| 5,264,405 A | 11/1993 | Jo Ann Canich | 502/103 |
| 5,272,236 A | 12/1993 | Lai et al. | 526/348.5 |
| 5,278,119 A | 1/1994 | Turner et al. | 502/155 |
| 5,352,749 A | 10/1994 | DeChellis et al. | 526/68 |
| 5,434,116 A | 7/1995 | Sone et al. | 502/103 |
| 5,489,659 A | 2/1996 | Sugano et al. | 526/127 |
| 5,502,124 A | 3/1996 | Crowther et al. | 526/127 |
| 5,585,509 A | 12/1996 | Langhauser et al. | 556/11 |
| 5,637,659 A | 6/1997 | Krishnamurti et al. | 526/133 |
| 5,637,660 A | 6/1997 | Nagy et al. | 526/160 |
| 5,643,847 A | 7/1997 | Walzer, Jr. | 502/117 |
| 5,840,947 A | 11/1998 | Küber et al. | |
| 6,211,312 B1 * | 4/2001 | Holtcamp | 526/133 |
| 6,232,260 B1 * | 5/2001 | Nagy et al. | 502/155 |

FOREIGN PATENT DOCUMENTS

| | | |
|---|---|---|
| CA | 2176687 | 11/1996 |
| CA | 2176867 * | 11/1996 |
| EP | 0279 863 | 10/1992 |
| EP | 0 590 486 A2 | 4/1994 |
| EP | 0 638 593 A | 2/1995 |
| EP | 0 741 145 A1 | 11/1996 |
| JP | 6-329143 | 7/1996 |
| JP | 8-239413 | 9/1996 |
| WO | WO 94/28032 | 12/1994 |
| WO | WO 95/04087 | 12/1995 |
| WO | WO 96 20223 A | 7/1996 |
| WO | WO 96/23004 | 8/1996 |
| WO | WO 96 34021 A | 10/1996 |
| WO | WO 98/22486 | 5/1998 |

OTHER PUBLICATIONS

Ji et al., J. Organometallic Chem. 296 (1985) 83–94.*
Nesmeyanov et al., J. Organometallic Chem. 231 (1982) 5–24.*
Thoma et al., J. Organometallic Chem. 192 (1980) 359–365.*
Ruble et al., J. Org. Chem. 61 (1996) 7230–7231.*
"Polymerization Catalysts with Cyclopentadienyl Ligands Ring–Fused to Pyrrole and Thiophene Heterocycles," John A. Ewen, et al., J.Am. Chem. Soc. 1998, 120, pp. 10786–10787.
"Diazo Compounds of Ferrocene," Nesmeyanov, et al, M.V. Lomonosov Moscow State University, pp. 1–6 (1963).
"Thiophene Analogues of Indenes," Meth–Cohn, et al, Acta Chemica Scandinavica, vol. 20, pp. 1733–1742 (1966).
"Thiophene Analogues of Indenes," Meth–Cohn, et al, Acta Chemica Scandinavica, vol. 20, pp. 1577–1587 (1966).
"The 2–Thiapentalenyl Anion," Cantrell, et al, Pergamon Press Tetrahedron Letters, #45, pp. 4477–4480, (1967).
"Organic Chemistry—Synthesis and Study of the Polarographic Reduction of Some Derivatives of Cobalticiuium Salts," Nabil El Murr and Rene Dabard, presented by Henri Normant, C.R. Acad. So. Paris, t. 272 (Jun. 14, 1971).
"A Chiral (Hydroxyalkylferrocenyl) Phosphine Ligand." Pergamon Press, Tetrahedron Letters, #48, pp. 4351–4354, (1976).

(List continued on next page.)

Primary Examiner—David W. Wu
Assistant Examiner—R. Rabago
(74) Attorney, Agent, or Firm—Charles E. Runyan, Jr.

(57) ABSTRACT

The invention relates to a polymerization catalyst system comprising a catalytic complex formed by activating a transition metal compound which comprises a metal selected from group 3 through 10 of the periodic table, preferably from group 4, 5, or 6 of the periodic table, and a group 13, 15, or 16 heterocyclic fused cyclopentadienide ligand. In one embodiment the inventive transition metal compound is represented by the $[L]_m M[A]_n (S)_o$ wherein M is a transition metal selected from groups 3 through 10 of the periodic table, and at least one of L is group 13, 15, or 16 heterocyclic fused cyclopentadienide ligand. Also disclosed is a polymerization process utilizing the catalyst systems of the invention. Ethylene polymerizations or copolymerizations with dimethyl (η5-pentamethylcyclopentadienyl)(1-azaindenyl) zirconium and bis(5-methyl-cyclopenta[b] thiophene) zirconium dichloride, activated by tris (pentafluorophenyl) boron and methylalumoxane, respectively, are illustrated.

21 Claims, No Drawings

OTHER PUBLICATIONS

"Asymmetric Hydrogenation Using Ferrocenylphosphine Rhodium(I) Cationic Complexes," Cullen, et al, Department of Chemistry, University of British Columbia, Vancouver, J. Organomet. Chem. (1977).

"Rhodium(I) Complexes of Ferrocenylphosphines as Efficient Asymmetric Catalysts. The Structure of Fe($\lambda^5$–$C_5H_3$(P($CMe_3$)$_2$–1, 3)($\lambda^5$–$C_5H_3$(CHMeN$Me_2$)P($CMe_3$)$_2$–1,2)," Journal of Organometallic Chemistry, 279 (1985) p. 5–21, Elsevier Sequoia S.A., Lausanne.

"Synthesis of Heterocyclic Compounds via Ferrocene," Zahid Hussain Chohan, Indian Journal of Chemistry, vol. 25B, Oct. 1986, pp. 1065–1066.

"New Ferrocenyl Sulfides and Selenides: Preparation and Application as Efficient Selective Hydrogenation Catalysts," Okoroafor, et al, Organometallics, (1988) pp. 7, 1297–1302.

"Comparison of the Catalytic Activity of Pd and Pt Complexes of Ferrocenyl Amine Sulfides Towards Selective Hydrogenation of Cyclooctadiene to Cyclooctene," Journal of Molecular Catalysis, Naiini, et al, (1989) L27–L32.

Reactions of Secondary Phosphines With A Phosphorus–Phosphorus Bond and Related Reactions, Avens, et al, Inorg. Chem., (1989) 28, pp. 205–211.

"Ferrocene Derivatives—Part 24," Khand, et al, J. Chem. Soc., Perkin Trans. 1 (1989), pp. 2075–2078.

"2–(Dimethylaminomethyl) Ferrocenyl Derivatives of Titanium and Zirconium—Limits of Chelating Interactions," Thiele, et al, Z. Anorg. Allg. Chem. (1990), pp. 590, 55–64.

"Homogeneous Selective Hydrogenation of Dienes and Styrene Derivatives by Use of Palladium Ferrocenyl Amine Sulfide Complexes as Catalysts," Naiini, et al, Journal of Molecular Catalysis, 67 (1991) pp. 47–56.

"Selective Reduction of Conjugated Double Bonds with Molecular Hydrogen and Palladium (II) Complexed to Ferrocenylamine Sulfide Catalysts," Ali, et al, Pergamon Press, Tetrahedron Letters, vol. 32, No. 40, pp. 5489–5492 (1991).

"Application of Palladium Ferrocenyl Amine Sulfide Complexes in the Hydrogenation of Carbon–Carbon Double and Triple Bonds," Ali, et al, Journal of Molecular Catalysis, 77 (1992) pp. 124–134.

"Ethylene Polymerization with Ansa–zirconocene/Methylalumin–oxane Catalyst Systems," Peng, et al, Makromol. Chem., Rapid Commun. 14, pp. 633–636 (1993).

"A Novel Easily Accessible Chiral Ferrocenyldiphosphine for Highly Enantioselective Hydrogenation, Allylic Alkylation, and Hydroboration Reactions," Togni, et al, J. Am. Chem. Soc. (1994), 116, pp. 4062–4066.

"PdCl2–Complexes Containing Phosphinoferrocenyloxazoline Ligands, X–ray Crystal Structure Analysis and Application to Grignard Cross–Coupling," Pergamon Press, Tetrahedron Letters, vol. 36, #21, pp. 3745–3748, (1995).

"Diastereo– and Enantioselectivity in the Co–oligomerization of Propene and Carbon Monoxide to Dimethyl–4–oxoheptanedioates," Sperrle, et al, J. Am. Chem. Soc., (1995), 117, pp. 12130–12136.

"New Ligand Environments for Soluble Ziegler–Natta Olefin Polymerization Catalyst Precursors," Mu, et al, Pergamon Press, Polyhedron, vol. 14, #1, pp. 1–10, (1995).

"Catalytic Polymerization of Phenylacetylene by Cationic Rhodium and Iridium Complexes of Ferrocene–Based Ligands," Lee, et al, Journal of Polymer Science: Part A: Polymer Chemistry, vol. 34, pp. 2377–2386, (1996).

"Synthesis, Characterization and Application in Asymmetric Hydrogenation Reactions of chiral Ruthenium(II) Diphosphine Complexes," Organometallics, (1996), 15, pp. 860–866.

"Novel Chiral Ligands, Diferrocenyl Dichalcogenides and Their Derivative, for Rhodium– and Iridium–Catalyzed Asymmetric Hydrosilylation," Organometallics, (1996), 15, pp. 370–379.

"8–Quinolylcyclopentadienyl, a Ligand with a Tailored Fit for Chelate Complexes," Enders, et al, Chem. Ber., (1996), 129, pp. 459–463.

"1,2–N, N–Dimethylaminomethylferrocenyl as a Ligand Towards Titanium and Vanadium," Hitchcock, et al, Chem. Commun., (1996), pp. 1985–1986.

"A Remarkable Anion Effect on the Enantioselectivity of the Pd–Catalyzed Allylic Amination Using Ferrocenyl Ligands," Burckhardt, et al, Pergamon Press, Tetrahedron: Asymmetry, vol. 8, #1, pp. 155–159, (1997).

"Synthesis, Structures, and Reactivities of Rhodium and Ruthenium Complexes with a Novel Chiral Cyclopentadienyl–Ferrocenyldiphenylphosphine Bidentate Ligand," Organometallics, (1997), 16, pp. 3091–3093.

"Preparation and Characterization of 2–(dimethylaminomethyl) Ferrocenyl Compounds of Titanium, Zirconium and Hafnium," Thiele, et al, J. Organomet. Chem., (1988), 352 (1–2), pp. 115–124 (Abstract Only).

"Coordination Chemistry of II–Bonded Cyclopentadienyl Chaldogeno–Ether, Part 2. Palladium(II) and Platinum(II) Complexes Of ($C_5$(SMe)$_5$Mn(CO)$_3$, ($C_5Cl_2$(SMe)$_2$(P$Ph_2$))Mn(CO)$_3$," Sunkel, et al, Z. Naturforsch vol. 50b, pp. 1307–1318 (1995).

"New Chiral Ferrocenylphosphines and Their Use as Ligands for Transition Metal Complex Catalyzed Asymmetric Synthesis," Kumada, et al, Kenkyu Hokoku—Asahi Garasu Kogyo Gijutsu Shoreikai, (1980), 37, pp. 69–82 (Abstract Only).

"Reversible .eta.6.fwdarw. .eta.5–Isomerization of Metalcarbonly Anions of Fluorenes, Indenes, and Their Analogs as a New Type of Metallotropic Tautomerism," Dokl. Akad. Nauk SSSR, (1980), 255(1), pp. 127–130, [Chem.] (Abstract Only).

"2, 6–Bis(methylenecyclopentadienyl)—pyridine—zirconocene and —hafnocene dichloride; formation and crystal structure of [C5H3N–2, 6– (CH2–C5H4) 2Zr (Cl) (OH2)] 2 [ZrCl6]," Thiele, et al, Z. Anorg. Allg. Chem. (1995), 621(6), pp. 1106–1110.

"The Chemistry Of Transition Metal Alkyl Compounds. 59. Cyclopentadienyl–2–(dimethylaminomethyl) Ferrocenyl Compounds of Early 3–d Elements," Thiele, et al, Z. Anorg. Chem. vol. 619, pp. 1111–1114, (1993).

"Synthesis Of New Optically Active Ferrocenylphosphine Ligands And Their Use In Catalytic Asymmetric Synthesis, "Kumada, et al, Asahi Glass Foundation For Industrial Technology, vol. 37, pp. 69–82 (1980).

"Ferrocenylamines," Herberhold, et al, J. of Organometallic Chemistry, vol. 241, pp. 227–240, (1983).

"Preparation of n–carbazyl and n–indolyl Derivatives of Titanium and Their Use as Ziegler–Natta Catalysts," IT–778386 B (Abstract Only).

"Chiral π–Complexes of Heterocycles with Transition Metals: A Versatile New Family of Nucleophilic Catalysts," Ruble, et al, J. Org. Chem., 61, (1996), 7230–7231.

"Effective Kinetic Resolution of Secondary Alcohols with a Planar–Chiral Analogue of 4-(Dimethylamino)pyridine. Use of the Fe($C_5Ph_5$) Group in Asymmetric Catalysts," Ruble, et al, J. Am. Chem. Soc., 119, (1997), 1492–1493.

"Nucleophilic Catalyst Does Kinetic Resolution," Stinson, C&EN Feb. 17, 1997.

"Ferrocenylamine", J. of Organometallic Chem., 241, Herberhold, et al, (1983) 227, English abstract only.

"1,1'–Bis(N,N–Dimethylamino) Ferrocene, 1,1'–Bis9N, N–Dimethylamino)Cobaltocenium Hexafluorophosphate and 1,1'–Bis(n,N–Dimethylamino) Titanocene Dicholoride, Crystal Structure of 1,1'–Bis(n, N–DImethylamino)Titanocene Dichloride", J. of Organomettalic Chem. 277, Stahl, et al, (1984) 113–125.

"Efficient Synthesis of rac–(Ethylenebis(indenyl))ZrX2 Complexes viia Amine Elimination", Organometallics, 14, Jordan, et al, (1995), p. 5.

Efficient New Synthetic Route to Bidentate, Monomeric Cyclopentadienyl–Amide Complexes of Group 4 Transition Metals: Synthesis and Characterization of the Zirconium and Hafnium Complexes [$\{\eta^5:\sigma-C_5H_4(CH_2)_3NMe\}MX_2(NHMe_2)$](X =Cl, I, M = Zr; X = I, M = Hf) and [$\{\eta^5:\sigma-C_5H_4(CH_2)_3NMe\}ZrX2$] (X = $Nme_2$, $Ch_2Ph$, $Ch_2Sime_3$, $BH_4$) and Molecular Structure of [$\{\eta^5:\eta-C_5H_4(CH_2)_3NMe\}ZrCl(Ch_2Ph)]_2$, Organometallics 12, Teuben, et al, (1993), pp. 1936–1945.

"Palladium(II)–Catalyzed Cyclization of Olefinic Tosylamides", J. Org. Chem., 61, Larock, et al, (1996), pp. 3584–3585.

"The Chemistry of 1–Pyrindines", Advances in Heterocyclic Chemistry, vol. 15, Freeman, pp. 187–231, (1973).

"Alkyl and Hydride Derivatives of (Pentamethylcyclopentadienyl) zirconium (IV)," Organometallics, 1, Wolczanski, et al, (1982), pp. 793–799.

"Invited Review. Somer Chemistry of Pentakis (methoxy–carbonyl)cyclopentadiene, $HC_5(CO_2Me)_5$, and Related Molecules,", Aust. J. Chem., 43, Bruce, et al, (1990), pp. 949–995.

"Synthesis, Thiation, and Reduction of Lactams", Tetrahedron, vol. 38, No. 3, Barbary, et al, (1982), p. 405.

"Progress in the Synthesis of Polycyclic Natural Products: The Total Synthesis of Lycopodine", Pure and Applied Chemistry, vol.,, 17, No. 3–4, Stork, pp. 383–401 (1968).

"Syntheses and Carbon Monoxide Substitution Reactions of $\eta^5$–N–Heterocycle manganese Tricarbonyls," J. of Organometallic Chem., 296, Basolo, et al, (1985) 83–94.

"Aminocyclopentadienes, Aminoferrocenes, and Aminocobaltocenes**", Agnew Chm. Int. Ed. Engl. ,34, zNo. 7, Plenio, et al, 1995, pp. 800–803.

* cited by examiner

POLYMERIZATION CATALYST SYSTEM COMPRISING HETEROCYCLIC FUSED CYCLOPENTADIENIDE LIGANDS

This is a continuation-in-part of U.S. Ser. No. 08/806,181, filed Feb. 25, 1997 now abandoned.

FIELD OF THE INVENTION

This invention relates to polymerization catalysts. More particularly, the invention relates to a polymerization catalyst system comprising a catalytic complex formed by activating transition metal compounds comprising cyclopentadienide anions which bear fused heterocyclic rings as substituents, and to a process for the polymerization or copolymerization of monomers and comonomers using the catalyst system.

BACKGROUND OF THE INVENTION

Transition metal compounds which function as catalysts are well known in the art. Some of the more successful ligands for such transition metal compounds are derived from a cyclopentadienide anion. Indeed, pi-bonded cyclopentadienide metal compounds, commonly referred to as "metallocenes," have found a broad range of applications including the catalysis of industrially important processes, the use as catalysts or synthetic intermediates in the synthesis of pharmaceuticals and other fine chemicals, and the use as precursors to inorganic materials.

Metallocenes are often used as components of "single-sited" polymerization catalyst systems. As discussed in U.S. Pat. No. 5,502,124, characteristics thought to impart catalytic activity to known metallocene catalysts include: a coordinatively unsaturated, electrophilic, metal center in a trigonal geometry; an active sigma bound substituent, preferably an alkyl or hydride radical; and a least a single vacant orbital cis to the sigma bound substituent. In addition to the active sigma bound substituent, the metal is bound to an inert ancillary ligand set, the purpose of which is to establish and maintain the proper electronic and steric environment of the metal center throughout the polymerization. Ancillary ligands may be defined as ligands which do not directly participate in the monomer insertion reaction, but which are covalently bound to the metal center by single or multiple bonds. Ancillary ligands are typically composed of organic and/or inorganic moieties in a discrete and well defined manner and generally have a molecular weight greater than about 50 amu (atomic mass units). The cyclopentadienide anion is prototypical of the ancillary ligands generally found in single-sited catalysts.

Neutral metallocenes which have the above characteristics, i.e., a coordinatively unsaturated electrophilic metal center, an active sigma bound substituent, and a least a single vacant orbital cis to the sigma bound substituent, are also active polymerization catalysts, often used to polymerize olefins. However, such neutral metallocene catalysts suffer from a propensity to dimerize to form inactive species. This tendency to deactivate by dimerization can be attenuated by using sterically demanding ancillary ligand sets, thus inhibiting the dimerization, but this approach is only partially successful. Moreover, the use of sterically demanding ancillary ligand sets may inhibit the polymerization of larger monomers or comonomers.

On the other hand, charged cationic complexes formed from metallocenes do not readily deactivate by dimerization and do not require the use of extremely sterically demanding ligand sets. In these cases, the repulsion due to like electrostatic forces prevents dimerization, thereby obviating the need for sterically demanding ligands and allowing for much greater reactivity of larger monomer substrates.

Despite the forgoing, only a relatively narrow range of ancillary ligands has been investigated. Known ancillary ligands often comprise a cyclopentadienyl moiety substituted with one or more substituents which are chosen primarily from alkyl, aryl, and fused aromatic groups. Frequently, a number of structural variants is examined in which both the steric and electronic properties are changed simultaneously. Efforts to directly determine the relative contributions of electronic and steric effects have to date met with only limited success, and access to a broader range of systematically variable ancillary ligands is therefore highly desirable.

Further, despite the ubiquity of heterocycles in nature, extremely few examples of such compounds suitable as cyclopentadienyl ligands can be found in the literature. Two reports of transition metal complexes of azaindenylide ligands have appeared in the literature. Basolo and coworkers reported a manganese pyrindinyl complex in 1985 (Basolo, F. J. et al., J. Organomet. Chem. 1985, 296, 83). More recently, Fu has reported an iron pyrindinyl complex and a dimethylamino substituted iron pyrindinyl complex (Fu, G. C. et al., J. Org. Chem. 1996, 61, 7230).

U.S. Pat. No. 5,434,116 and PCT publication WO 95/04087 discuss catalyst compositions comprising heterocyclopentadienyl ligands, where one of the carbon atoms in a cyclopentadienyl ligand has been replaced with a group 15 heteroatom.

U.S. Pat. No. 5,489,659 discusses metallocenes which comprise two bridged cyclopentadienyl groups, each of which is bonded to the metal, wherein at least one of the cyclopentadienyl groups is substituted with a ring system which comprises a silicon-containing hydrocarbon group.

Several heteroatom-substituted cyclopentadienide ligands have been reported. For example, aminocyclopentadienyl complexes of iron, a group 8 metal (see Nesmeyanov, A. N. et al. Dokl. Acad. Nauk. SSSR 1963, 150, 102; Herberhold, M. et. al, .J. Organomet. Chem. 1983, 241, 227), and cobalt, a group 9 metal (see El Murr, N.Conpt. Rend. 1971, C272, 1989), have been disclosed. In these instances the amino substituent was incorporated by substitution on the cyclopentadienyl ring of the pre-formed metallocene. Use of an amino cyclopentadiene or dienyl precursor to synthesize iron and titanium complexes has also be reported by Stahl, K. P. et al.(J. Organomet. Chem. 1984, 277, 113). More recently, Plenio et. al (Angew. Chem. Int. Ed. Engl. 1995, 34, 800) have disclosed the formation of aminocyclopentadiene and dienyl precursors to their corresponding ferrocene complexes. This report also disclosed the use of the related 2-dimethylaminoindene and indenyl precursors. In all of these examples, however, the nitrogen heteroatom is exocyclic to the cyclopentadienyl ring and is not a part of a heterocyclic ring system.

Because ligands are so important in determining the polymerization behavior of catalysts for the reasons discussed above, the development of new transition metal catalyst systems exhibiting enhanced activities and selectivities frequently requires the synthesis of new organic compounds to serve as ligands for the transition metal centers of the active catalysts or their precursors. A need thus exists for transition metal compounds, and catalysts formed therefrom, which have ligands bearing a greater range of substituents and which span a greater range of electronic properties.

SUMMARY OF THE INVENTION

In accordance with the present invention there is provided a polymerization catalyst system comprising a catalytic complex formed by activating for polymerization a transition metal compound which comprises a metal selected from groups 3 through 10 of the periodic table, preferably from groups 4, 5, or 6 of the periodic table, and a group 13, 15, or 16 heterocyclic fused cyclopentadienide ligand. In one embodiment, the transition metal compounds used in the invention are represented by the formula:

wherein:

M is a transition metal selected from groups 3 through 10 of the periodic table, preferably from groups 4, 5, and 6, and more preferably from group 4;

L is a cyclopentadienide-containing ligand which may be the same as or different from any other L, but at least one L is a group 13, 15, or 16 heterocyclic fused cyclopentadienide ligand;

A is a monatomic or polyatomic ligand, other than a cyclopentadienide-containing ligand, which bears a formal negative charge and can be the same as or different from any other A;

D' is an optional donor ligand which may or may not be present;

m is an integer which has a value of 1, 2, or 3;

n is an integer which has a value of 1, 2, or 3; and o is an integer representing the number of optional donor ligands D'.

In another embodiment, the present invention is a polymerization process comprising the step of contacting a monomer and, optionally, or one or more comonomers, with the aforementioned polymerization catalyst system.

DETAILED DESCRIPTION OF THE INVENTION

In this patent specification, references to the elemental groups will be made in accordance with the new IUPAC nomenclature for the Periodic Table of Elements, as described in Chemical and Engineering News, 63(5) 27, 1985). Under this convention the groups are numbered 1 to 18.

Transition Metal Compounds of the Invention

The transition metal compounds of the invention comprise a metal selected from groups 3 through 10 of the periodic table, preferably from groups 4, 5, or 6 of the periodic table, and a group 13, 15, or 16 heterocyclic fused cyclopentadienide ligand. Those of ordinary skill will understand that this description alone does not necessarily indicate that the ligands exist in the transition metal compounds of the invention as anions, or with substantial anionic character, although they may in fact so exist. Thus, in merely naming and describing the components of the invention, the ligands may be alternately referred to as anionic species or as neutral radicals, according to ordinary conventions of nomenclature, without intending to specify the ionic or covalent nature of the chemical bonds involved.

The transition metal compounds of this invention may be prepared by extensions of well established methodologies. Generally one of three routes to cyclopentadienide complexes is employed in the art although a great many more are known and those of skill in the art will appreciate that these may also be of utility in preparing heterocyclic fused cyclopentadienide complexes. The most common route to cyclopentadienide transition metal complexes involves the formation of an alkali metal salt of the cyclopentadienide anion followed by a metathesis reaction with a transition metal halide. The formation of these alkali metal salts is well known in the art and is generally accomplished by treating the cyclopentadiene compound with an alkali metal alkyl or hydride compound such as butyl lithium or potassium hydride. A second route to transition metal complexes of cyclopentadienide ligands involves elimination of an amine or an alkane from a transition metal amide or alkyl species, respectively, on treatment with the cyclopentadiene compound (See for example, R. F. Jordan et al. Organometallics, 1995, 14, 5; J. H. Teuben et. al. Organometallics, 1993, 12, 1936.). A third commonly employed route to transition metal complexes of cyclopentadienide ligands utilizes trialkylsilyl derivatives of the cyclopentadiene compound. On thermolysis with these derivatives transition metal halides often eliminate trialkylsilyl chloride and produce the desired cyclopentadienide complex.

The group 13, 15, or 16 heterocyclic fused cyclopentadienide ligands of the invention are characterized by the presence of a cyclopentadienide moiety and a heterocyclic ring fused thereto. The cyclopentadienide moiety is well known to those of ordinary skill and possesses a formal charge of $-1$, thus being formally an anionic species. When all five carbon atoms of the cyclopentadienyl moiety are bound to the metal, the ligand is said to be "eta-5" bonded. Similarly, when only four are bonded, the ligand is "eta-4" bonded, and so on. Thus, the heterocyclic fused cyclopentadienide ligands may be bonded in an eta-5 fashion, although the mode of bonding may be eta-1, eta-2, eta-3, or eta-4.

Heterocyclic rings are sometimes referred to simply as "heterocycles." "Heterocyclic ring" and "heterocycle" will be used interchangeably herein. Generally, heterocycles are polyatomic ring systems which usually, but not always, comprise a majority of carbon atoms linked through sigma or pi bonds, or both, and which also comprise at least one endocyclic atom that is not a carbon atom (see Hawleys Condensed Chemical Dictionary 12th edition) (defining heterocyclic); see also "Heterocyclic Chemistry" 3rd Ed., J. A. Joule, K. Mills, G. F. Smith, Chapman & Hall, London, 1995. For the purposes of this invention, "heterocycle" and "heterocyclic ring" shall be taken to mean a polyatomic ring system in which at least one carbon atom of the ring system has been replaced by an atom selected from group 13, 15, or 16 of the periodic table of elements. Thus, as defined herein, a group 13, 15, or 16 heterocyclic fused cyclopentadienide ligand comprises a fused heterocycle which incorporates at least one atom selected from group 13, 15, or 16 of the periodic table of the elements, wherein said group 13, 15, or 16 atom is endo to at least one ring of said heterocycle.

The heterocycle may be fused to the cyclopentadienide moiety in a number of modes. Most commonly, the fused heterocyclic compounds will be joined to the cyclopentadienide moiety as ortho-fused substituents where two adjacent carbon atoms of the cyclopentadienide moiety are each bonded to atoms that are members of the fused heterocycle. Thus, the adjacent carbon atoms are shared with the pendant heterocyclic ring and are endo to both ring systems. The fused heterocyclic ring could be a monocyclic ring system or a polycyclic ring system, with the proviso that at least one of the rings contained within the polycyclic ring system is a heterocyclic ring. The fused heterocyclic rings may be aliphatic or aromatic in nature and may comprise olefinically unsaturated moieties.

An endocyclic heteroatom of the group 13, 15, or 16 heterocyclic fused cyclopentadienide ligand may be bonded to one or more ring carbon atoms, or it may be bonded to other endocyclic or exocyclic heteroatoms, or both. In one embodiment, the group 13, 15, or 16 heterocyclic fused cyclopentadienide ligands will contain as endocyclic heteroatoms one or more atoms selected only from the group consisting of boron, nitrogen, phosphorus, oxygen, and sulfur, preferably one or more atoms selected only from the group consisting of nitrogen, oxygen, and sulfur, and still more preferably the group 13, 15, or 16 heterocyclic fused cyclopentadienide ligands will contain as endocyclic heteroatoms only one or more nitrogen heteroatoms. In yet another embodiment, the group 13, 15, or 16 heterocyclic fused cyclopentadienide ligand will contain as endocyclic heteroatoms only one or more sulfur heteroatoms.

The group 13, 15, or 16 heterocyclic fused cyclopentadienide ligands of the invention may be substituted. As used herein, substitution on the group 13, 15, or 16 heterocyclic fused cyclopentadienide ligands is meant to indicate the replacement of a hydrogen radical on the group 13, 15, or 16 heterocyclic fused cyclopentadienide ligand with any non-hydrogen radical, or the placement of any radical, including hydrogen, on one or more of the group 13, 15, or 16 heteroatoms of the group 13, 15, or 16 heterocyclic fused cyclopentadienide ligand to complete the valency of said heteroatoms. It will be understood by those skilled in the art that "replacement of a hydrogen radical" does not require direct replacement of a hydrogen radical on a group 13, 15, or 16 heterocyclic fused cyclopentadienide ligand, although it may be so accomplished. For example, the starting materials used to prepare the substituted group 13, 15, or 16 heterocyclic fused cyclopentadienide ligand may already be substituted with non-hydrogen radicals, either by direct replacement of a hydrogen radical, or by virtue of having been prepared from substituted starting materials themselves.

Suitable substituents for the group 13, 15, or 16 heterocyclic fused cyclopentadienide ligands are selected independently and without any limitation as to number except that which is dictated by the number of substitution positions available on the group 13, 15, or 16 heterocyclic fused cyclopentadienide and include, for example, $C_1$–$C_{20}$ hydrocarbyl radicals including $C_1$–$C_{20}$ linear and branched alkyl radicals such as methyl, ethyl, propyl, butyl, pentyl, hexyl, heptyl, octyl, nonyl, decyl, $C_1$–$C_{20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, $C_1$–$C_{20}$ hydrocarbyl-substituted and unsubstituted aryl radicals including phenyl, methylphenyl, trimethylphenyl, cyclohexylphenyl, napthyl, butylphenyl, butyldimethylphenyl; $C_1$–$C_{20}$ substituted hydrocarbyl radicals including benzyl, N,N-dimethylaminobenzyl, N,N-dimethylaminomethyl, methoxymethyl, diphenylphosphinomethyl, fluorophenyl, trifluoromethylphenyl, fluoromethyl, cyanoethyl; $C_1$–$C_{20}$ linear and branched halocarbyl radicals including trifluoromethyl, perfluoroethyl, perfluoropropyl, perfluorobutyl, perfluorophenyl, chlorodifluoromethyl, chlorotetrafluorophenyl, bromotetrafluorophenyl, iodotetrafluorophenyl; $C_1$–$C_{20}$ substituted-halocarbyl radicals such as methyltetrafluorophenyl, N,N-dimethyldifluoromethyl, methoxyperflouroethyl; $C_1$–$C_{20}$ hydrocarbyl-substituted organometalloid radicals including trimethylsilyl, trimethylgermyl, triphenylsilyl, triphenylgermyl; $C_1$–$C_{20}$ halocarbyl-substituted organometalloid radicals including tris(trifluoromethyl)silyl, tris(trifluoromethyl)germyl, tris(perfluorophenyl)silyl, tris(perfluorophenyl)germyl; $C_1$–$C_{20}$ hydrocarbyl-substituted boron radicals including dimethylboranyl, diphenylboranyl; $C_1$–$C_{20}$ hydrocarbyl-substituted pnictogen radicals including N,N-dimethylamino, diphenylamino, diphenylphosphino, dimethylphosphino; $C_1$–$C_{20}$ hydrocarbyl-substituted chalcogen radicals including methoxy, ethoxy, butoxy, phenoxy, methylthio, ethylthio, phenylthio, and halogen radicals including fluoro, chloro, bromo, and iodo.

Bridging groups may be present in the inventive transition metal compounds in at least two modes. Other modes will be readily apparent to those of ordinary skill in the art. In the first mode, the transition metal compounds will contain two or more cyclopentadienide-containing ligands, at least one of which will be a group 13, 15, or 16 heterocyclic fused cyclopentadienide ligand, wherein the cyclopentadienyl-containing ligands may be linked to each other through bridging groups. For example, a first group 13, 15, or 16 heterocyclic fused cyclopentadienide ligand may be bridged to a second group 13, 15, or 16 heterocyclic fused cyclopentadienide ligand, which may be the same or different from the first group 13, 15, or 16 heterocyclic fused cyclopentadienide ligand. Alternatively, a group 13, 15, or 16 heterocyclic fused cyclopentadienide ligand may be bridged to a cyclopentadienide-containing ligand which is not a group 13, 15, or 16 heterocyclic fused cyclopentadienide ligand.

In a second mode, the cyclopentadienyl-containing ligands of the inventive transition metal compounds, including the group 13, 15, or 16 heterocyclic fused cyclopentadienide ligands, may be connected through bridging groups to a heteroatom, for example nitrogen, which is itself directly bonded to the metal of the transition metal compound. This mode of bridging is sometimes present in certain known systems where only one cyclopentadienide-containing ligand is present, sometimes referred to as "monocyclopentadienyl" or "mono Cp" systems. Such bonding is shown schematically below in formula (1):

$$[L]\{T\}[JR]M \qquad (1)$$

where M is a metal selected from group 3 through 10 of the periodic table, preferably from group 4, 5, or 6; L is cyclopentadienide-containing ligand, which may be a group 13, 15, or 16 heterocyclic fused cyclopentadienide ligand, bonded to M; J is a group 15 or 16 heteroatom having a formal negative charge and also being bonded to M, and when J is a group 15 heteroatom, J may be substituted with a substituent group R, where R is hydrogen or any of the aforementioned substituents said to be suitable for substitution on the group 13, 15, or 16 heterocyclic fused cyclopentadienide ligands of the invention; and T is a bridging group covalently bonded to both L and Y. Transition metal compounds containing such bridging groups bonded to cyclopentadienyl-containing ligands are disclosed in, for example, U.S. Pat. No. 5,264,405. In the transition metal compounds of the present invention, however, the presence of the second mode of bridging is not limited to "monocyclopentadienyl" or "mono Cp" systems.

In either mode of bridging, the bridging group T may be bonded to the cyclopentadienide portion of the group 13, 15, or 16 heterocyclic fused cyclopentadienide ligand, or it may be bonded to the heterocycle thereof Suitable bridging groups T in either mode comprise one or more of, or a combination of, a carbon, a germanium, a silicon, a phosphorous or a nitrogen atom-containing radical, including but not limited to $R^k_2C$, $R^k_2Si$, $R^k_2SiR^k_2Si$, $R^k_2SiR^k_2C$, $R^k_2Ge$, $R^k_2SiR^k_2Ge$, $R^k_2GeR^k_2C$, $R^kN$, $R^kP$, $R^k_2CR^kN$, $R^k_2CR^kP$, $R^k_2SiR^kN$, $R^k_2SiR^kP$, $R^k_2GeR^kN$, $R^k_2GeR^kP$ where each $R^k$ is independently, a radical group which is hydride, $C_{1-30}$ hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen.

In one embodiment of the invention, the polymerization catalyst system comprises a catalytic complex formed by activating a transition metal compound which comprises a metal selected from group 3 through 10 of the periodic table, preferably from group 4, 5, or 6, and a group 13, 15, or 16 heterocyclic fused cyclopentadienide ligand, wherein the heterocyclic fused cyclopentadienide ligand is substituted with a $C_1$–$C_{20}$ hydrocarbyl radical, preferably a $C_1$–$C_6$ hydrocarbyl radical, at the 2-position of the cyclopentadienyl moiety of the heterocyclic fused cyclopentadienide ligand. Preferably, one or more of the cyclopentadienide-containing ligands is bridged to another cyclopentadienide-containing ligand according to the first mode of bridging described above.

In another embodiment the transition metal compounds of the invention have the general formula (2):

$$[L]_mM[A]_n(D')_o \quad (2)$$

wherein:

M is a transition metal selected from groups 3 through 10 of the periodic table, preferably from groups 4, 5, and 6, and more preferably from group 4;

L is a cyclopentadienide-containing ligand which may be the same as or different from any other L, but at least one L is a group 13, 15, or 16 heterocyclic fused cyclopentadienide ligand;

A is a monatomic or polyatomic ligand, other than a cyclopentadienide-containing ligand, which bears a formal negative charge and can be the same as or different from any other A;

D' is an optional donor ligand which may or may not be present;

m is an integer which has a value of 1, 2, or 3;

n is an integer which has a value of 1, 2, or 3; and o is an integer representing the number of optional donor ligands D'.

In one embodiment, the transition metal compound is given by formula (2), but with additional proviso that the sum of m+n is equal to four. In another embodiment, one or more of the ligands L in formula (2) is bridged according the first mode of bridging described above.

In formulae (1) and (2), suitable cyclopentadienide-containing ligands L which are not heterocyclic fused cyclopentadienide ligands are the substituted and unsubstituted cyclopentadienides, indenides, and fluorenides. Specific examples of these are cyclopentadienide, methylcyclopentadienide, ethylcyclopentadienide, n-propylcyclopentadienide, i-propylcyclopentadienide, n-butylcyclopentadienide, i-butylcyclopentadienide, t-butylcyclopentadienide dimethylcyclopentadienide, 2,3-dimethylcyclopentadienide, 2,4-dimethylcyclopentadienide, indenide, 1,2-diethylcyclopentadienide, ethylcyclopentadienide, 2-cyclohexy-3-methylcyclopentadienide, 2-cyclohexy-4-methylcyclopentadienide, n-octylcyclopentadienide, beta-phenylpropylcyclopentadienide, tetrahydroindenyl, benzylcyclopentadienide, 2,4-diphenyl-3-methylcyclopentadienide, trifluromethylcyclopentadienide, trimethylsilcyclopentadienide, trimethylcyclopentadienide, tetramethylcyclopentadienide, pentamethycyclopentadienide, fluorenide, octahydrofluorenide, N,N-dimethylamidocyclopentadienide, dimethylphosphidocyclopentadienide, and the like, and isomers thereof.

The ligands A in formula (2) are exemplified by, but not limited to, hydride radicals, hydrocarbyl radicals, such as alkyl and aryl radicals and derivatives thereof, substituted hydrocarbyl radicals, halocarbyl radicals, substituted halocarbyl radicals, and hydrocarbyl- and halocarbyl-substituted organometalloid radicals, halogen radicals such as F, Cl, Br, and I and the like, alkoxide radicals, aryloxide radicals, amide radicals, phosphide radicals, and the like, or a combination thereof. Additionally, two ligands A may be joined to form a metallacycle ring containing from about 3 to about 20 carbon atoms.

The optional donor ligands D' in formula (2) include species known to form adducts with transition metal compounds, such as, for example, ethers, cyclic ethers, amines, phosphines, nitrites, and the like, as well as other polar species.

The preferred transition metal compounds of this invention are group 4, 5, or 6 transition metal compounds having the following features: two ancillary stabilizing ligands at least one of which is a Group 13, 15, or 16 heterocyclic fused cyclopentadienide ligand; two reactive sigma bound species such as alkyl or hydride; and a group 4, 5, or 6 metal in its highest oxidation state. The preferred transition metal compounds are represented by formula (3):

$$\{[L']^q\}_m\{T\}\{[L'']^p\}_nM[A']_2 \quad (3)$$

wherein:

M is a group 4, 5, or 6 transition metal it its highest oxidation state;

L' and L" are the same or different substituted or unsubstituted ancillary stabilizing ligands, at least one of which is a Group 13, 15, or 16 heterocyclic fused cyclopentadienide ligand;

A', which can be the same as or different from any other A', is a reactive sigma bound species bearing a formal negative charge of one and is selected from hydride radicals, alkyl and substituted or unsubstituted aryl radicals, halocarbyl radicals, and hydrocarbyl-substituted organometalloid radicals;

T is an optional bridging group connecting a ligand L' to a ligand L";

q and p are integers representing the formal charge on the substituted or unsubstituted ancillary stabilizing ligands L' and L", respectively; and m and n are integers equal to 1 or 2 and are chosen such that (m×q)+(n×p)=(s−2), where s is the group number of M.

In the above description, "(m×q)+(n×p)=(s−2)" shall be interpreted in its usual algebraic sense throughout this patent specification to indicate that the quantity "m times q" plus the quantity "n times p" is equal to the quantity "s minus 2."

In formula (3) above, when L' or L" is a cyclopentadienide-containing ligand which is not a group 13, 15, or 16 heterocyclic fused cyclopentadienide ligand, L' or L" are exemplified by the ligands described above for ligands L in formula (2).

The ligands A' in formula (3) are exemplified by hydrogen, $C_1$–$C_{20}$ hydrocarbyl groups such as methyl, ethyl, propyl, butyl, pentyl, hexyl, heptyl, octyl, nonyl, decyl, cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl, and substituted derivatives and isomers thereof, phenyl, methylphenyl, trimethylphenyl, cyclohexylphenyl, napthyl, butylphenyl, butyldimethylphenyl, and substituted derivatives and isomers thereof, halocarbyl radicals such as, for example, tricholormethyl, trifluorormethyl, trichloroethyl, trifluoroethyl and the like, and hydrocarbyl-substituted organometalloid radicals such as, for example, trimethylsilyl and trimethylgermyl, and the like.

The group 13, 15, or 16 heterocyclic fused cyclopentadienide ligands of the invention can be used as pi-bonded cyclopentadienide-containing ligands in transition metal compounds which comprise: 1) a heteroatom which has a formal negative charge and which is directly bonded to the metal atom; and 2) a bridging group linking the heteroatom with a pi-bonded cyclopentadienide-containing ligand. These features are illustrated in formula (1) above. Thus, in yet another embodiment, the transition metal compounds of the present invention may be represented by formula (4) below:

$\{[L'^p]_m\{T\}\{[JR_y]^p\}_nM[A]_2 \quad (4)$ where:

M is a transition metal selected from group 4, 5, or 6 of the periodic table;

L' is a substituted or unsubstituted ancillary stabilizing ligand as set forth above in formula (3), but at least one L' is a group 13, 15, or 16 heterocyclic fused cyclopentadienide ligand;

J is a group 15 or 16 heteroatom having a formal negative charge and also being bonded to M;

R is a substituent group bonded to J and is as described above in formula (1);

y has a value of zero or 1 as necessary to complete the valency or J;

T is an optional bridging group as set forth above in formula (1) and is bonded to one of the ligands L' and to heteroatom J;

A is a ligand as described above in formula (2);

q and p are integers representing the formal charge on the substituted or unsubstituted stabilizing ligand L' $JR_y$, respectively; and m and n are integers equal to 1 or 2 and are chosen such that $(m \times q)+(n \times p)=(s-2)$, where s is the group number of M.

In another embodiment, the transition metal compounds of the invention are represented by the formula (5) below:

$\{L'\}\{T\}\{[JR_y]\}M[A]_2 \quad (5)$

M is a transition metal selected from group 4 of the periodic table;

L' is a group 13, 15, or 16 heterocyclic fused cyclopentadienide ligand;

J is a group 15 heteroatom having a formal negative charge and also being bonded to M;

T is an optional bridging group connecting L' and J though one or more covalent linkages;

R is hydrogen or any of the aforementioned substituents said to be suitable for substitution on the group 13, 15, or 16 heterocyclic fused cyclopentadienide ligands of the invention;

y is the number of substituents R which are bound to J and may be equal to 0, 1, or 2 as dictated by the valency of J and the presence or absence of bonds to the optional bridging group T; and A is a monatomic or polyatomic ligand bearing a formal negative charge of one and is defined above in formula (2).

In one embodiment, the transition metal compound of the invention is represented by formula (5) above wherein M is titanium, J is nitrogen, R is an alkyl group, and T is a dimethylsilyl group.

In other embodiments of the transition metal compounds of the invention, the group 13, 15, or 16 heterocyclic fused cyclopentadienide ligand is represented by formula (6) below:

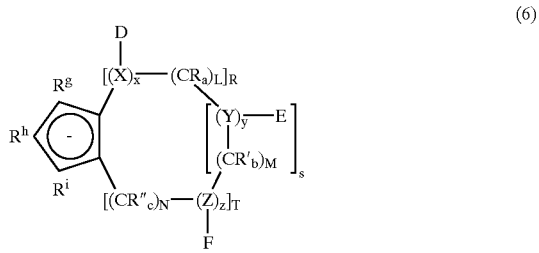

(6)

wherein:

X, Y, and Z are, independently, group 13, 15, or 16 heteroatoms;

x, y, and z represent the number of heteroatoms X, Y, and Z, respectively, and have integer values of zero or greater;

D, E, and F are substituents which complete the valency of X, Y, and Z as required and are, independently, hydrogen, halogen, or a $C_1$ to $C_{30}$ alkyl or aryl group or a substituted derivative thereof and, optionally, two or more of D, E, and F can be joined together to form a ring;

$R^g$, $R^h$, and $R^i$ are, independently, hydrogen, halogen, or $C_1$ to $C_{30}$ alkyl, alkylidene, or aryl groups, or substituted derivatives thereof, including derivatives wherein one or more carbons atoms is replaced with a group 13, 15, or 16 heteroatom;

$CR_a$, $CR'_b$, and $CR''_c$ are hydrocarbyl units, and R, R', and R'' are, independently, hydrogen, halogen, or $C_1$ to $C_{30}$ alkyl, alkylidene, or aryl groups, or substituted derivatives thereof, including derivatives wherein one or more carbons atoms is replaced with a group 13, 15, or 16 heteroatom, and, optionally, wherein two or more of said R, R', and R'' are joined together, or are joined with one or more of D, E, and F, to form a ring;

a, b, and c represent the number of substituents R, R', and R'' respectively, and have integer values of 1 or 2;

L, M, and N represent the number of hydrocarbyl groups $CR_a$, $CR'_b$, and $CR''_c$, respectively, and have integer values of zero or greater;

R, S, and T are integers of value zero or greater, such that
$[(R \times x)+(S \times y)+(T \times z)] \geq 1$;
$[(R \times L)+(S \times M)+(T \times N)] \geq 1$;
$[(R \times x)+(S \times y)+(T \times z)+(R \times L)+(S \times M)+(T \times N)] \geq 3$; and the bonds between any of the atoms may be single or double bonds, or may have resonance hybrid character, as required to satisfy the valencies of each atom.

As shown by the requirements placed on the integers x, y, z, L, M, N, S, T and R, the ligand described in formula (5) has a ring fused to a cyclopentadienide group, said ring having at least three atoms not shared by the cylcopentadienide group of the ligand and at least one of which is a group 13, 15, or 16 heteroatom. The substituents D, E, and F complete the valency of X, Y, and Z, as required. For example, if X has a valency of three, and two of these valencies are used in forming a double bond with the carbon atom of hydrocarbyl group $CR_a$, the remaining valency must be used to form a bond with a carbon atom of the cyclopentadienide group. In this case, D will not be present since D is not required to complete the valency of X (since all of the valencies of X are occupied). On the other hand, if X has a valency of three and one of these valencies is used to form a single bond with the carbon atom of $CR_a$, and another is used to form a single bond with a cyclopentadienide ring carbon, D must be present since D is necessary to complete the valency of X.

Preferably in formula (6) above, X, Y, and Z are independently selected from the group consisting of boron, nitrogen, phosphorus, oxygen, and sulfur, more preferably from the group consisting of nitrogen, oxygen, and sulfur, and still more preferably X, Y, and Z will all be nitrogen. Exemplary of substituents $R^g$, $R^h$, $R^i$, R, R', R", D, E, and F are those substituents described above as being generally suitable for the group 13, 15, or 16 heterocyclic fused cyclopentadienide ligands of the invention.

In still other embodiments, the group 13, 15, or 16 heterocyclic fused cyclopentadienide ligand is formed from a substituted or unsubstituted azaindene or a substituted or unsubstituted tetrahydroazaindene. Thus, the group 13, 15, or 16 heterocyclic fused cyclopentadienide ligands of the invention can be formed by the deprotonation of compounds represented by formulae I–IV below, but as will be appreciated by those of ordinary skill in the art, routes to metal cyclopentadienide complexes which do not require the formal deprotonation of ligand precursors are known.

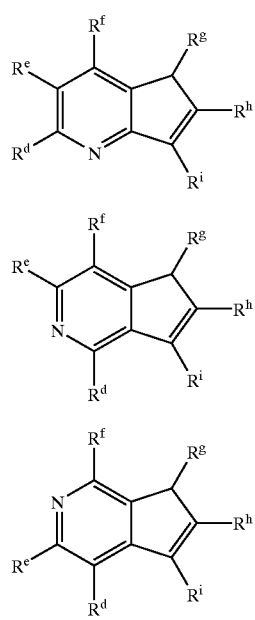

I

II

III

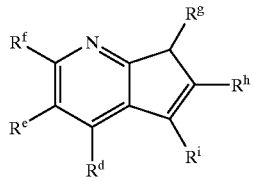

IV

Numerous ring systems are referred to in the literature as "azaindene ring systems." However, as used herein, the azaindene ring system is to be understood as having the basic ring structures shown above in formulae I–IV. These azaindene ring systems are sometimes referred to in the literature as pyrindines and named according to the location of the nitrogen atom and the saturated carbon of the five-membered ring. Thus the ring systems of formulae I through IV may be called 5H-1-pyrindine, 5H-2-pyrindine, 7H-2-pyrindine, and 7H-1-pyrindine, respectively. The names "5H-1-pyrindine" and 1-azaindene will be used interchangeably herein and will be understood to refer to the same compound. Those of ordinary skill in the art will appreciate that when formulae II, III, and IV represent unique derivatives based the choice of substituent groups, they will be encompassed in the present invention. The substituent groups $R^d$ $R^e$ $R^f$ $R^g$ $R^h$ and $R^i$ are selected independently, they may be the same or different are either 1) hydrogen or 2) the substituents which are generally suitable for the group 13, 15, or 16 heterocyclic fused cyclopentadienide ligands of the invention, those substituents having already been discussed above. When $R^d$ $R^e$ $R^f$ $R^g$ $R^h$ are all hydrogen, it will be understood that the 1-azaindene ring system is an unsubstituted 1-azaindene ring system. Tetrahydroazaindenyl ring systems derived from any of the compounds shown in Formulae I, II, III, and IV are also suitable for use as the group 13, 15, or 16 heterocyclic fused cyclopentadienide ligands of the invention.

In a particularly preferred embodiment, the group 13, 15, or 16 heterocyclic fused cyclopentadienide ligands are selected from the group consisting of the ligands whose ring structures are shown below in Diagram (1), tetrahydroazaindenyl ring systems derived therefrom, and substituted derivatives thereof wherein one or more hydrogen atoms (which are not pictured, but which will be understood by those of ordinary skill to be implicitly present in the structures of Diagram (1)) is substituted with any of the substituents suitable for substitution on the group 13, 15, or 16 heterocyclic fused cyclopentadienide ligands as described previously herein:

Diagram (1)

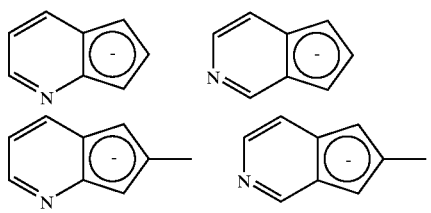

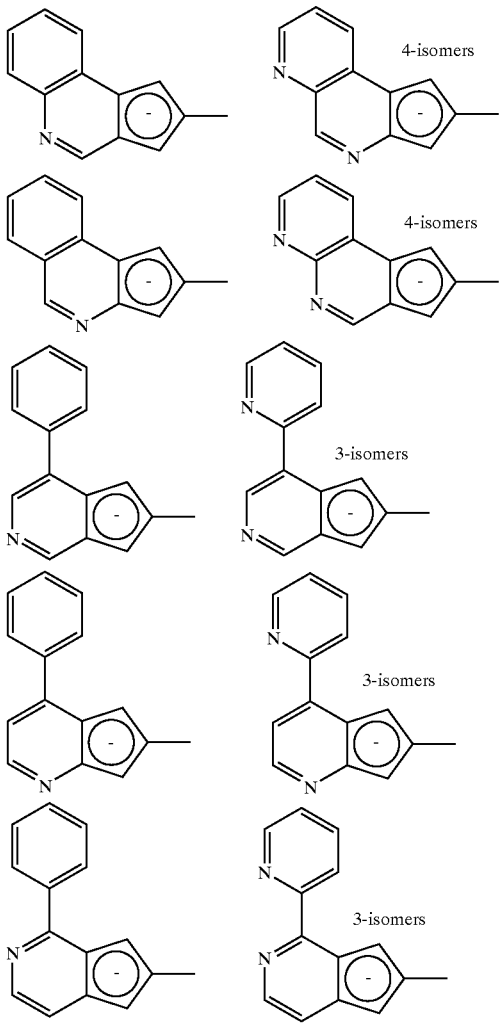

In a most preferred embodiment, the transition metal compound of the invention is any of those previously described in this patent specification wherein the transition metal is selected from the group consisting of titanium, zirconium, and hafnium. In one embodiment of the invention, the transition metal compound is dimethyl (η5-pentamethylcyclopentadienyl)(azaindenyl)zirconium (also referred to herein as (I)). In yet another embodiment of the invention, the transition metal compound is bis(5-methyl-cyclopenta[b]thiophene)zirconium dichloride (also referred to herein as (II)).

The compounds suitable as precursors to group 13, 15, or 16 heterocyclic fused cyclopentadienide ligands of the present invention may be prepared by methods known in the art. For the parent 1-azaindene ligand depicted in formulae I, II, III, and IV above when the substituent groups $R^d$ $R^e$ $R^f$ $R^g$ $R^h$ and $R^i$ are all hydrogen, the synthesis is readily accomplished on a large scale beginning with 2,3-cyclopentopyridine. The transformation follows methods described in, for example, Robison, M. R., *J. Am. Chem. Soc.*, 1958, 80, 4677. Thus, oxidation of 2,3-cyclopentenopyridine with hydrogen peroxide in hot acetic acid provides the 2,3-cyclopentenopyridine N-oxide. Acylation of this material with acetic anhydride, followed by gentle thermolysis, provides the 7-acetoxy-4,5-dihydropyrindine. Elimination of acetic acid from this material occurs on treatment with concentrated sulfuric acid to provide pyrindine (1-azaindene) as a mixture of double bond isomers. Alternatively, the acetate derivative may be hydrolyzed to the hydroxyl derivative. This material is also readily transformed to 1-azaindene by treatment with concentrated sulfuric acid. In addition, methods for preparing numerous and varied derivatives of 1-azaindene will be readily apparent to those of ordinary skill as described in, for example, Freeman, F. *Adv. Heter. Chem.* 1973, 15, 187.

Formation of tetrahydroazaindenyl ring systems derived from any of the compounds shown in Formulae I, II, III, and IV, and in Diagram (1), may be accomplished, either prior to attachment to the transition metal or after ligation, using methods known in the art, such as, for example hydrogenation of the azaindenylide ligand system by use of either a homogeneous or heterogeneous hydrogenation catalyst. Alternatively, the tetrahydroazaindene ligand may be synthesized by known methods and then ligated to the metal by conventional methods. Aza-annulation reactions of the type developed by Stork (G. Stork, Pure Appl. Chem. 1968, 17, 383) and others (for example, A. A. El-Bararbary, et al. Tetrahedron 1982, 405) are suitable for constructing these type of ring systems. Also suitable are methods described recently by Larrock (Larrock et al., J. Org. Chem. 1996, 61, 3584) which utilize a palladium catalyzed cyclization to provide the hexahydro-azaindene ring system.

Those of ordinary skill in the art will appreciate that these transformations and others known in the art may be extended to a variety of related compounds to provide precursors to the group 13, 15, or 16 heterocyclic fused cyclopentadienide ligands of the invention.

Catalyst Systems of the Invention

The catalyst systems of the invention comprise a catalytic complex formed by activating one or more of the transition metal compounds of the invention. As used herein "catalytic complex" means any species capable of polymerizing monomers having olefinic or acetylenic unsaturation. "Activation" or "activating" means the process or act of bringing a transition metal compound of the invention and an activator into such proximity that a catalytic complex is formed.

The transition metal compounds of the invention may be activated by use of the traditional means of activation, specifically including the use of alkyl alumoxane compounds as activators, and ionizing activators, such as those represented by aryl-substituted boron compounds such as nitrogen-containing salts, carbenium, silylium or phosphonium salts, metal salts and neutral Lewis acid compounds. Each method is well-documented in the metallocene catalyst art. Thus, in some embodiments the inventive catalyst systems comprise the reaction product of an alkyl alumoxane and a transition metal compound of the invention. In other embodiments, the inventive catalyst systems comprise the reaction product of an ionizing activator and a transition metal compound of the invention.

Related means of activation, such as the use of alkyl aluminum or other metal alkyl alkylating agents to convert metallocene halide compounds to hydride or alkyl group-containing compounds prior to activation with the ionizing activator compounds, will be suitable in accordance with the instant invention. For example, it will be understood by those skilled in the art that if ionizing activator compounds are to be used with transition metal compounds of the invention which do not contain ligands reactive toward ionizing activators, such transition metal compounds may be treated with alkylating agents, for example, to incorporate such reactive ligands, and that this step is one of the steps necessary to form a catalytic complex by ionic activation in these circumstances.

In one embodiment, the catalytic complexes of the invention are prepared by combining a transition metal compound of the invention with an ionizing activator to provide a catalytic complex according to formula (7):

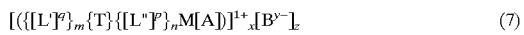 (7)

wherein:

M is a transition metal selected from group 4, 5, or 6 of the periodic table;

L' and L" are the same or different substituted or unsubstituted ancillary ligand at least one of which is a group 13, 15, or 16 heterocyclic fused cyclopentadienide ligand;

A is a monatomic or polyatomic ligand bearing a formal negative charge of one and is defined above in formula (2);

T is an optional bridging group connecting a ligand L' and a ligand L" and is described above in formula (1);

q and p are integers representing the formal charge on the substituted or unsubstituted ancillary stabilizing ligands L' and L", respectively;

m and n are integers equal to 1 or 2 and are chosen such that $(m \times q)+(n \times p)=(s-2)$, where s is the group number of M;

x is the number of singly charged cations;

B is a compatible non-coordinating anion of charge y;

z is the number of non-coordinating anions of charge y; and $(z \times y)=x$.

In the catalytic complex defined by formula (7), "$(z \times y)=x$" shall be interpreted in its usual algebraic sense throughout this patent specification to indicate that the quantity "z times y" is equal to the value x. The compatible non-coordinating anion B is preferably a single anionic coordination complex comprising a plurality of lipophilic radicals covalently bound to and shielding a central charge-bearing metal or metalloid atom, which anion is bulky, labile, and capable of stabilizing the unsaturated cationic transition metal compound. Suitable non-coordinating anions B include any of those known in the art, such as, for example, those described in U.S. Pat. Nos. 5,198,401 and 5,278,119. The group 13, 15, or 16 heterocyclic fused cyclopentadienide ligand may be any of those already described herein.

In one embodiment, the catalyst system of the invention may utilize one or more different transition metal compounds of the invention, or other transition metal compounds, including metallocenes or other classes of polymerization catalysts, such as, for example the well-known Ziegler-Natta catalysts based on transition metal halides. Such mixed catalyst systems are often employed to achieve broadened, bimodal, or multimodal MWD weight polymers capable of improved processing or properties. Also, use of the inventive metallocenes with another metallocene capable of narrow MWD and low MIR, but having lower comonomer incorporation capacity, should yield polymers having a narrow MWD and a broadened composition distribution (CD).

The catalyst systems of the invention may further comprise a support. Any effective method of supporting coordination catalyst systems may be used to incorporate the support, effective meaning that the catalyst system so prepared can be used for preparing polymer in a gas phase, solution, or slurry polymerization process. Methods for supporting catalyst systems are well known in the art.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene, polyolefin or polymeric compounds, or any other organic support material, and the like, that has an average particle size greater than 10 µm.

The preferred support materials are inorganic oxide materials, which include those from the Periodic Table of Elements of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

In one embodiment, the catalyst system of the invention is supported according to the methods described in copending U.S. patent application Ser. No. 08/265,533 filed on Jun. 24, 1994, now abandoned and Ser. No. 08/412,810 filed on Mar. 29, 1995, now abandoned each of which is hereby incorporated by reference for its teaching as to methods of supporting catalysts.

Polymerization Process of the Invention

The catalyst systems of this invention are suited for the polymerization of monomers and comonomers having olefinically or acetylenically unsaturated units in any polymerization or prepolymerization process, gas, slurry or solution phase; even a high pressure autoclave or high pressure tubular process may be utilized.

In one embodiment, the inventive polymerization process is directed toward slurry or gas phase polymerization or copolymerization reactions involving the polymerization, and optionally prepolymerization, of one or more of the alpha-olefin monomers having from 2 to 20 carbons.

In another embodiment, the inventive polymerization process comprises contacting, under gas-phase, slurry, or solution polymerization conditions:

a) a monomer containing olefinically or acetylenically unsaturated units;

b) optionally, one or more comonomers having olefinically or acetylenically unsaturated units; and c) a catalyst system comprising a catalytic complex formed by activating any of the transition metal compounds of the invention.

In a preferred embodiment the monomer is ethylene and the one or more comonomers are selected from alpha-olefins. The invention is particularly well suited to homopolymerization or copolymerization reactions involving the polymerization of one or more of the olefins, for example one or more of ethylene, propylene, butene-1, isobutylene, pentene-1, 4-methylpentene-1, hexene-1, octene-1, decene-1, and cyclic olefins such as norbornene, as well as other monomers containing olefinically unsaturated units, such as, for example, styrene and derivatives thereof. Other monomers can include diolefins such as acyclic dienes, for example 1,4-hexadiene, α,ω-1,7-octadiene, and the like, and cyclic dienes such cyclooctadiene, ethylidene norbornene, norbornadiene, and dicyclopenatadiene, as well as acetylenically unsaturated monomers such as acetylene. In one embodiment, the process of the invention is directed toward the polymerization of ethylene and optionally one or more comonomers selected from the group consisting of alpha-olefin and diolefins having from 3 to 15 carbon atoms, in another embodiment 4 to 12 carbon atoms and most preferably in another embodiment 4 to 10 carbon atoms. In yet another embodiment ethylene and an alpha-olefin comonomer is polymerized with at least one other comonomer, which may be a second, different alpha-olefin, to form a terpolymer or other interpolymer.

In another embodiment of the process of the invention, the olefin(s) are prepolymerized in the presence of the catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833 and 4,921,825 and EP-B-0279 863, published Oct. 14, 1992 all of which are incorporated fully herein by reference. All the catalyst systems of the invention may be optionally prepolymerized or used in conjunction with an additive or scavenging component to enhance catalytic productivity.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670 and 5,352,749 and WO 94/28032 published Dec. 8, 1994 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

A slurry polymerization process generally uses pressures in the range of about 1 to about 500 atmospheres and even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, isobutylene, ethylbenzene or xylene. The medium employed should be liquid under the conditions of polymerization and relatively inert. In another embodiment, hexane or isobutane is employed.

EXAMPLES

In order to provide a better understanding of the present invention, the following examples are offered.

Synthesis Example 1

Unless otherwise noted, the syntheses of all metal complexes were performed under a nitrogen atmosphere in dry, deoxygenated, solvents in an inert atmosphere drybox or using standard Schlenk techniques.

Transition metal compound (1), which is dimethyl (η5-pentamethylcyclopentadienyl)(azaindenyl)zirconium, has the following structural formula:

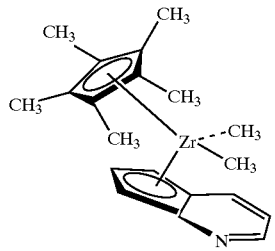

and was prepared as follows: trimethyl(η5-pentamethylcyclopentadienyl)zirconium was prepared using methods known in the art (see, for example, P. T. Wolczanski J. E. Bercaw, Organometallics, 1982, 1, 793) and was subsequently dissolved in toluene at ambient temperature. To this solution was added one equivalent of the neutral ligand, 1-azaindene, as a toluene solution. Gas evolution was observed. After stirring for 15 minutes, the volatiles were removed in vacuo to give (1). Yield 92%. Single crystals suitable for x-ray analysis were obtained by recrystallization from pentane at −25° C. $^1$H NMR (250 MHz, $C_6D_6$) 8.68 (d, 1H), 7.52 (d, 2H), 6.67 (dd, 1H), 6.05 (m, 1H) 5.89 (m, 1H), 5.42 (m, 1H).$^{13}$C (62.89 MHz , $C_6D_6$) 150.64, 143.15, 132.51, 119.72, 118.18, 117.84, 113.20, 99.78, 99.50, 39.50, 35.1, 11.58.

Synthesis Example 2

Bis(5-methyl-cyclopenta[b]thiophene)zirconium dichloride, (II), was prepared as follows: 5-methyl-6H-cyclopenta[b]thiophene was prepared using methods due to O. Meth-Cohn and S. Gronowitz, which can be found at Acta Chem. Scand., 1966, 20, 1577 and Acta Chem. Scand., 1966, 20, 1733. The 5-methyl-6H-cyclopenta[b]thiophene product was then directly converted to the lithiated product by butyllitium as described by T. S. Cantrell and B. L. Harrison in Tetrahedron Lett., 1967, 4477. The metallocene was then prepared by combining 2.4 g (17 mmol) of lithiated 5-methyl-6H-cyclopenta[b]thiophene with 2.0 g (8.5 mmol) of $ZrCl_4$ in 100 ml of toluene. The mixture was stirred for 12 hours at room temperature, followed by stirring under reflux conditions for an additional hour. The toluene solution was then filtered and the filtrate was maintained at −30 ° C. for three days, during which time 0.6 g of bright yellow solid (II) separated from the solution. The solid (II) was recrystallized from 50 ml of toluene at −30° C.

Polymerization Example 1

Transition metal compound (1) (20.0 mg) was dissolved in 5 ml of toluene and transferred to a standard 1-liter autoclave reactor containing 400 ml of hexane. Tris (perfluorophenyl) boron (74.0 mg) was dissolved in 5 ml of toluene and added to the reactor. The reactor was brought to 60° C. and the contents stirred for 5 minutes prior to charging the reactor with 150 psi of ethylene. The contents were maintained at 60° C. for 4 minutes, then the polymerization was stopped by rapidly venting and cooling the reactor. The solid was recovered and dried to give 8.0 g of polyethylene, Mn=68,000; Mw=167,000, MWD=2.46.

Polymerization Example 2

Transition metal compound (1) (20.0 mg) was dissolved in 5 ml of toluene and transferred to a standard 1-liter autoclave reactor containing 400 ml of hexane. Tris (perfluorophenyl)boron (74.0 mg) was dissolved in 5 ml of toluene and added to the reactor. The reactor was brought to 60° C. and the contents stirred for 5 minutes prior to charging the reactor with 75 psi of ethylene. The contents were maintained at 60° C. for 20 minutes, then the polymerization was stopped by rapidly venting and cooling the reactor. The solid was recovered and dried to give 25.1 g of polyethylene, Mn=63,000; Mw=169,000, MWD=2.70.

Polymerization Example 3

A metallocene solution was prepared by dissolving 10 mg of bis(5-methyl-cyclopenta[b]thiophene)zirconium dichloride (II) in 100 cc of toluene. At room temperature, a 0.5 liter stirred autoclave reactor was charged with 250 cc of hexane and 10 cc of a toluene solution of methylalumoxane containing 10% by weight of methylalumoxane. The reactor pressure was vented before heating to the reaction temperature of 115.7° C. Propylene was added until the reactor pressure reached 110.4 psig (7.6 bar). The reactor pressure was then raised to 235 psig (16.2 bar) with ethylene. Under these conditions, the monomer concentrations were 1.0 M for propylene and 0.7 M for ethylene, resulting in monomer concentration molar ratios ($C_3/C_2$) of 1.43. After adjusting reactor pressure, the polymerization was commenced by feeding the metallocene solution to the reactor. The polymerization was run in semibatch mode with pure ethylene feed to the reactor. During the run the metallocene solution was pumped into the reactor at a rate between 0 and 1 cc/min depending on the ethylene make-up flow rate. This flow rate was kept at about 0.03 to 0.22 SLPM. The polymerization was run for 30 min and used 14 cc of the metallocene solution, or 1.4 mg of (II). The yield was 5.36 grams of polymer, corresponding to a catalyst efficiency of 3.83 kg/g.

Polymerization Example 4

A metallocene solution was prepared by dissolving 10 mg of bis(5-methyl-cyclopenta[b]thiophene)zirconium dichloride (II) in 100 cc of toluene. At room temperature, a 0.5 liter stirred autoclave reactor was charged with 250 cc of hexane and 10 cc of a toluene solution of methylalumoxane containing 10% by weight of methylalumoxane. Three (3) cc of ethylidene norbornene (ENB) were then added to the reactor. The reactor pressure was vented before heating to the reaction temperature of 115° C. Propylene was added until the reactor pressure reached 110 psig (7.6 bar). The reactor pressure was then raised to 234 psig (16.1 bar) with ethylene. Under these conditions, the monomer concentrations were 1.0 M for propylene, 0.7 M for ethylene, and 0.07 M for ENB, resulting in monomer concentration molar ratios ($C_3/C_2$/ENB) of 14.3/10/1. After adjusting reactor pressure, the polymerization was commenced by feeding the metallocene solution to the reactor. The polymerization was run in semibatch mode with pure ethylene feed to the reactor. The metallocene solution was pumped into the reactor at a rate between 0 and 4 cc/min depending on the ethylene make-up flow rate. This flow rate was kept at about 0.03 to 0.6 SLPM. The polymerization was run for 30 min and used 60 cc of the metallocene solution, or 6 mg of (II). The yield was 7.89 grams of polymer, corresponding to a catalyst efficiency of 1.32 kg/g.

Polymerization Example 5

A metallocene solution was prepared by dissolving 10 mg of bis(5-methyl-cyclopenta[b]thiophene)zirconium dichloride (II) in 100 cc of toluene. At room temperature, a 0.5 liter stirred autoclave reactor was charged with 250 cc of hexane and 10 cc of a toluene solution of methylalumoxane containing 10% by weight of methylalumoxane. Forty (40) cc of hexene-1 were added to the reactor and the reactor was heated to about 80° C. The reactor was then pressurized with ethylene to 125 psig (8.6 bar). Under these conditions, the monomer concentrations were 1.0 M for hexene-1 and 0.75 M for ethylene, resulting in a monomer concentration molar ratio ($C_6/C_2$) of 1.3. After adjusting reactor pressure, the polymerization was commenced by feeding the metallocene solution to the reactor. The polymerization was run in semibatch mode with pure ethylene feed to the reactor. The metallocene solution was pumped into the reactor at a rate between 0 and 1 cc/min depending on the ethylene make-up flow rate. This flow rate was kept at about 0.01 to 0.7 SLPM. The polymerization was run for 30 min and used 5 cc of the metallocene solution, or 0.5 mg of (II). The yield was 8.26 grams of polymer, corresponding to a catalyst efficiency of 16.52 kg/g. The polymer contained 11.4 wt. % of incorporated hexene.

We claim:

1. A polymerization catalyst system comprising a catalytic complex formed by activating a transition metal compound; wherein the transition metal compound is represented by the formula:

wherein:
  a) M is a Group 3, 4, 5, 6, 7, 8, 9, or 10 metal;
  b) L' is a substituted or unsubstituted stabilizing ligand, at least one L' is a heterocyclic fused ring cyclopentadienide ligand having a $C_5$ cyclopentadienide moiety and one or more fused-ring heterocycles in which at least one heteroatom is selected from Group-13, -15, or -16 elements;
  c) J is a group 15 or 16 heteroatom having a formal negative charge bonded to M;
  d) R is a substituted bonded to J;
  e) y has a value of zero, 1 or 2 as necessary to complete the valency of J;
  f) T is an optional bridging group that L' and J;
  g) A is a monatomic or polyatomic ligand, other than a cyclopentadienide-containing ligand, which bears a formal negative charge of one and can be the same as or different from any other A;
  h) q and p are integers representing the formal charge on the substituted or unsubstituted stabilizing ligand L' and $JR_y$, respectively; and
  i) m is an integer equal to 1 or 2 and n is an integer equal to 0, 1, or 2 and are chosen such that (M×q)+(n×p)= (s−2), where s is the Group number of M.

2. A polymerization catalyst system comprising a catalytic complex formed by activating a transition metal compound with an activator wherein the transition metal compound comprises a metal selected from Group-3, -4, -5, -6, -7, -8, -9, or -10 metals and at least one heterocyclic fused cyclopentadienide ligand wherein the ligand is a substituted or unsubstituted stabilizing ligand having a 5-carbon cyclopentadienide moiety and one or more fused-ring heterocycles in which at least one heteroatom is selected from Group-13, -15, or -16 elements.

3. The polymerization catalyst system of claim 2 wherein the transition metal compound is represented by the formula:

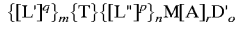

wherein:
a) M is a Group-3, -4, -5, -6, -7, -8, -9, or -10 metal;
b) L' and L" are stabilizing ligands, at least one of which is the heterocyclic fused cyclopentadienide ligand of claim 2;
c) A is a monatomic or polyatomic ligand, other than a cyclopentadienide-containing ligand, which bears a formal negative charge of one and can be the same as or different from any other A;
d) T is an optional bridging group connecting ligand L' to ligand L";
e) q and p are integers representing the formal charge on ligands L' and L", respectively;
f) m and n are integers, wherein m equals 1 or 2 and n equals 0, 1, or 2, chosen such that (m×q)+(n×p)=(s−2), where s is the group number of M;
g) r represents the number of ligands, A;
h) D' is an optional donor ligand, which may or may not be present; and
i) o is the number of optional donor ligands.

4. The polymerization catalyst system of claim 3 wherein:
a) M is a Group-4, -5, or -6 metal in its highest oxidation state;
b) L' is the heterocyclic fused cyclopentadienide ligand of claim 2;
c) L" is $JR_y$
    (i) J is a Group-15 or -16 heteroatom, bonded to M, having a formal negative charge;
    (ii) R is a substituent bonded to J;
    (iii) y has a value of zero, 1 or 2 as necessary to complete the valency of J;
d) T optionally bridges L' and J;
e) A is selected from hydride radicals, substituted or unsubstituted alkyl and aryl radicals, halocarbyl radicals, and hydrocarbyl-substituted organometalloid radicals;
f) r equals 2;
g) o equals zero;
h) q and p are integers representing the formal charge on the L' and L", respectively; and
i) m is an integer equal to 1 or 2 and n is an integer equal to 0, 1, or 2 and are chosen such that (m×q)+(n×p)=(s−2), where s is the group number of M.

5. The polymerization catalyst system of claim 3 wherein
a) at least one heteroatom is selected from boron, nitrogen, phosphorus, oxygen, or sulfur;
b) m is an integer, which has a value of 1, or 2 and
c) r is an integer which has a value of 1, 2, or 3.

6. The polymerization catalyst system of claim 2 or 3 wherein M is a Group-4,-5, or -6 metal.

7. The polymerization catalyst system of claim 2, 3 or 4, wherein at least one heteroatom is nitrogen, oxygen, or sulfur.

8. The polymerization catalyst system of claim 7 wherein at least one heteroatom is nitrogen.

9. The polymerization catalyst system of claim 2, 3, or 4 wherein the metal is titanium, zirconium, or hafnium.

10. The polymerization catalyst system of claim 8 wherein at least one heterocyclic fused cyclopentadienide ligand is formed from a substituted or unsubstituted, azaindene or tetrahydroazaindene.

11. The polymerization catalyst system of claim 2, 3, or 4 wherein at least one heterocyclic fused cyclopentadienide ligand is selected from the ligands shown below, their tetrahydroazaindenyl derivatives, their substituted derivatives and their substituted tetrahydroazaindenyl derivatives:

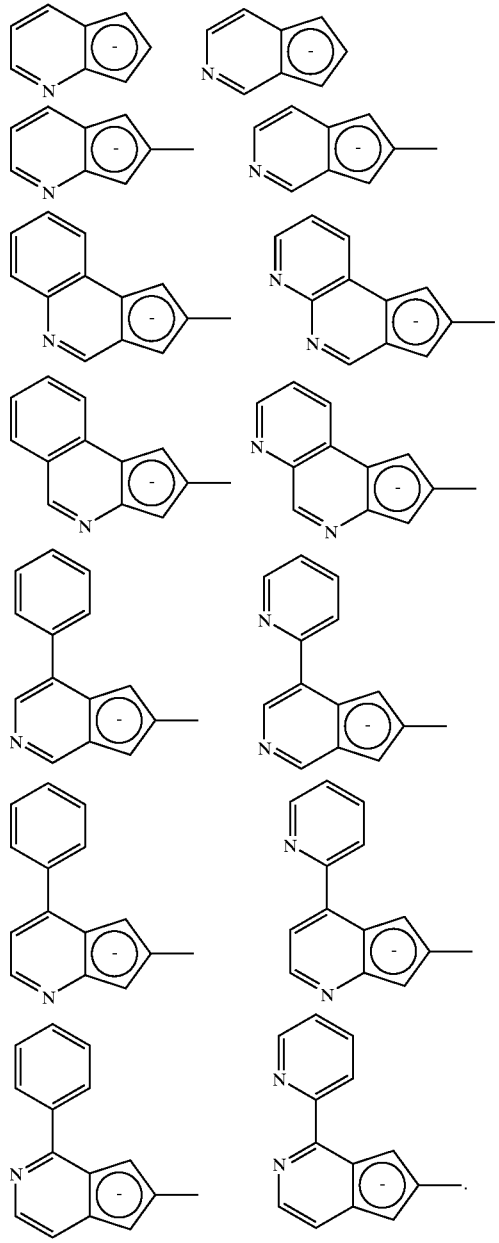

12. The polymerization catalyst system of claim 2, 3 or 4 wherein at least one heteroatom is sulfur.

13. The polymerization catalyst system of claim 12 wherein the transition metal compound is bis(5-methyl-cyclopentathiophene)zirconium dichloride.

14. The polymerization catalyst system of claim 10 wherein the transition metal compound is dimethyl (η5-pentamethylcyclopentadienyl) (azaindenyl)zirconium.

15. The polymerization catalyst system of claim 4 wherein:
a) M is a Group 4 transition metal;
b) at least one heteroatom of L' is boron, nitrogen, phosphorus, oxygen, or sulfur;
c) R is one of hydrogen; $C_1$–$C_{20}$ branched or unbranched, substituted or unsubstituted, alkyl radicals; $C_1$–$C_{20}$ substituted or unsubstituted, cyclic or polycyclic, aliphatic radicals; $C_1$–$C_{20}$ substituted or unsubstituted, cyclic or polycyclic, aromatic radicals; $C_1$–$C_{20}$ branched or unbranched, substituted or unsubstituted, haloalkyl radicals; $C_1$–$C_{20}$ branched or unbranched, substituted or unsubstituted, organometalloid radicals; $C_1$–$C_{20}$ branched or unbranched, substituted or unsubstituted, boron radicals; $C_1$–$C_{20}$ branched or unbranched, substituted or unsubstituted, pnictide radicals; $C_1$–$C_{20}$ branched or unbranched, substituted or unsubstituted, chalcide radicals; and d) y is the number of R substituents that are bound to J and may be equal to 0, 1, or 2 as dictated by the valency of J and the presence or absence of bonds to the optional bridging group T.

16. A polymerization catalyst system comprising the catalytic compound of the catalyst system of claim 2, 3, or 4 and at least one non-coordinating anion.

17. A polymerization process comprising contacting, under gas-phase, slurry, or solution polymerization conditions:

a) a monomer containing olefinically or acetylenically unsaturated units;

b) optionally, one or more comonomers having olefinically or acetylenically unsaturated units; and c) the catalyst system of claim 2, 3 or 4.

18. The process of claim 17 wherein the monomer is ethylene and the one or more comonomers are selected from alpha-olefins and dienes.

19. The catalyst system of claim 2, 3, 4, 5 or 15 wherein the activator is an alkyl alumoxane.

20. The catalyst system of claim 2, 3, 4, 5 or 15 wherein the activator is an ionizing activator.

21. The polymerization catalyst system of claim 4 wherein at least one R is a hydrogen, methyl, ethyl, propyl, butyl, pentyl, hexyl, heptyl, octyl, nonyl, decyl, cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, phenyl, methyphenyl, trimethylphenyl, cyclohexylphenyl, napthyl, butylphenyl, butylphenyl, butyldimethylphenyl, benzyl, N,N-dimethylaminobenzyl, N,N-dimethylaminomethyl, methoxymethyl, kephenylphosphimomethyl, fluorophenyl, trifluoromethylphenyl, fluoromethyl, cyanoethyl, trifluoromethyl, perfluoroethyl, perfluoropropyl, perfluorobutyl, perfluorophenyl, chlorodifluoromethyl, chlorotetrafluorphenyl, bromotetrafluorophenyl, iodotetrafluorophenyl, methyltetrafluorophenyl, N,N-dimethyldifluoromethyl, methoxyperflouroethyl, trimethylsilyl, trimethylgermyl, triphenylsilyl, triphenylgermyl, trissilyl, trisgermyl, trissilyl, trisgermyl, dimethylboranyl, diphenylboranyl, N,N-dimethylamino, diphenylamino, diphenylphosphino, dimethylphosphino, methoxy, ethoxy, butyox, phenoxy, methylthio, ethylthio, phenylthio, fluoro, chloro, bromo, or iodo radical.

* * * * *

UNITED STATES PATENT AND TRADEMARK OFFICE
CERTIFICATE OF CORRECTION

PATENT NO. : 6,451,938 B1
DATED : September 17, 2002
INVENTOR(S) : Fisher et al.

It is certified that error appears in the above-identified patent and that said Letters Patent is hereby corrected as shown below:

Column 9,
Line 47, after "L'" insert -- and --.

Column 20,
Line 29, replace "a" with -- one of the -- and replace "metal" with -- metals --.
Line 39, replace "substituted" with -- substituent --.
Line 42, after "that" insert -- bridges --.
Line 51, replace "(Mxq)" with -- (mxq) --.

Signed and Sealed this

Ninth Day of August, 2005

JON W. DUDAS
*Director of the United States Patent and Trademark Office*